Patented Oct. 12, 1954

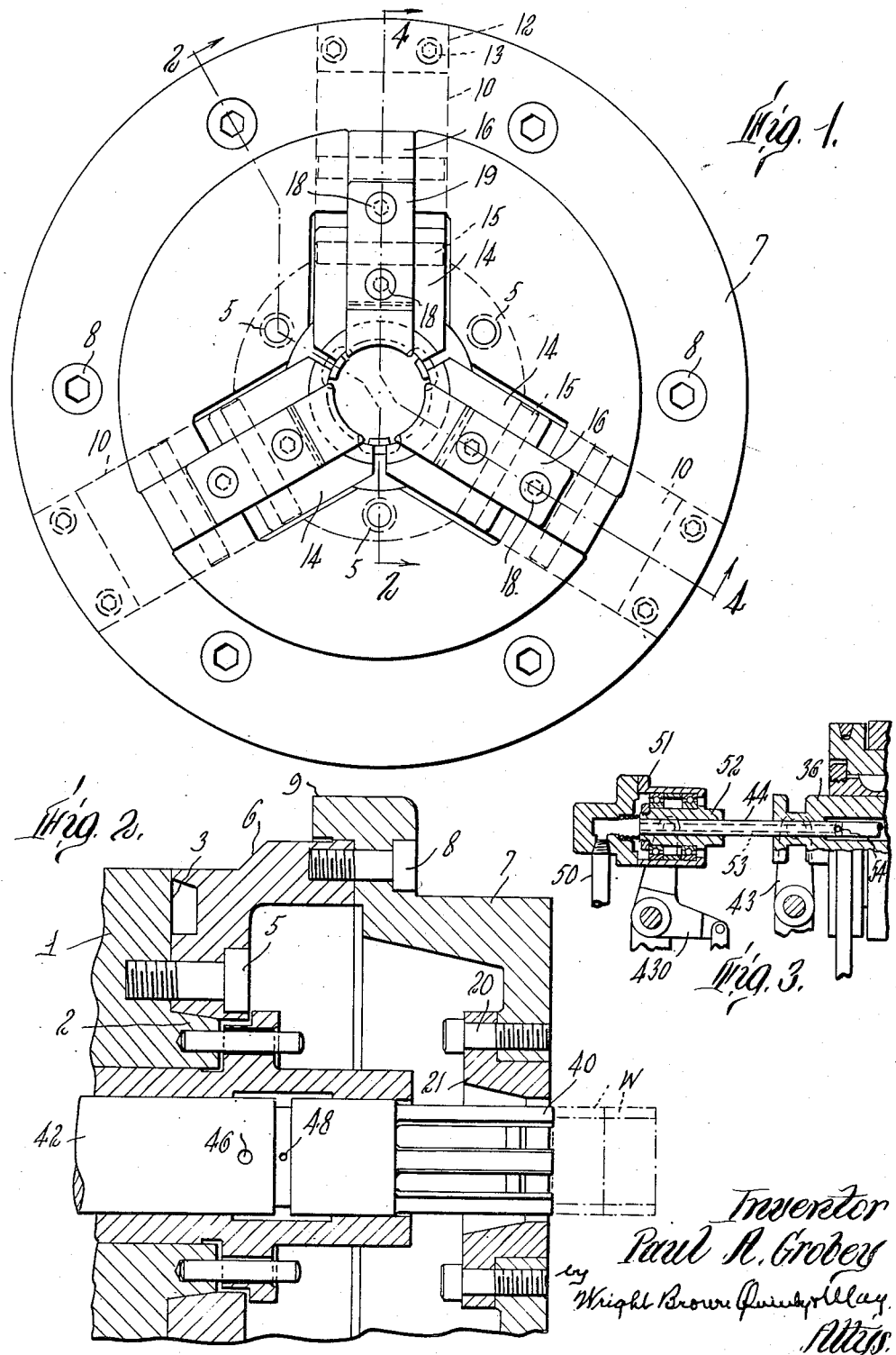

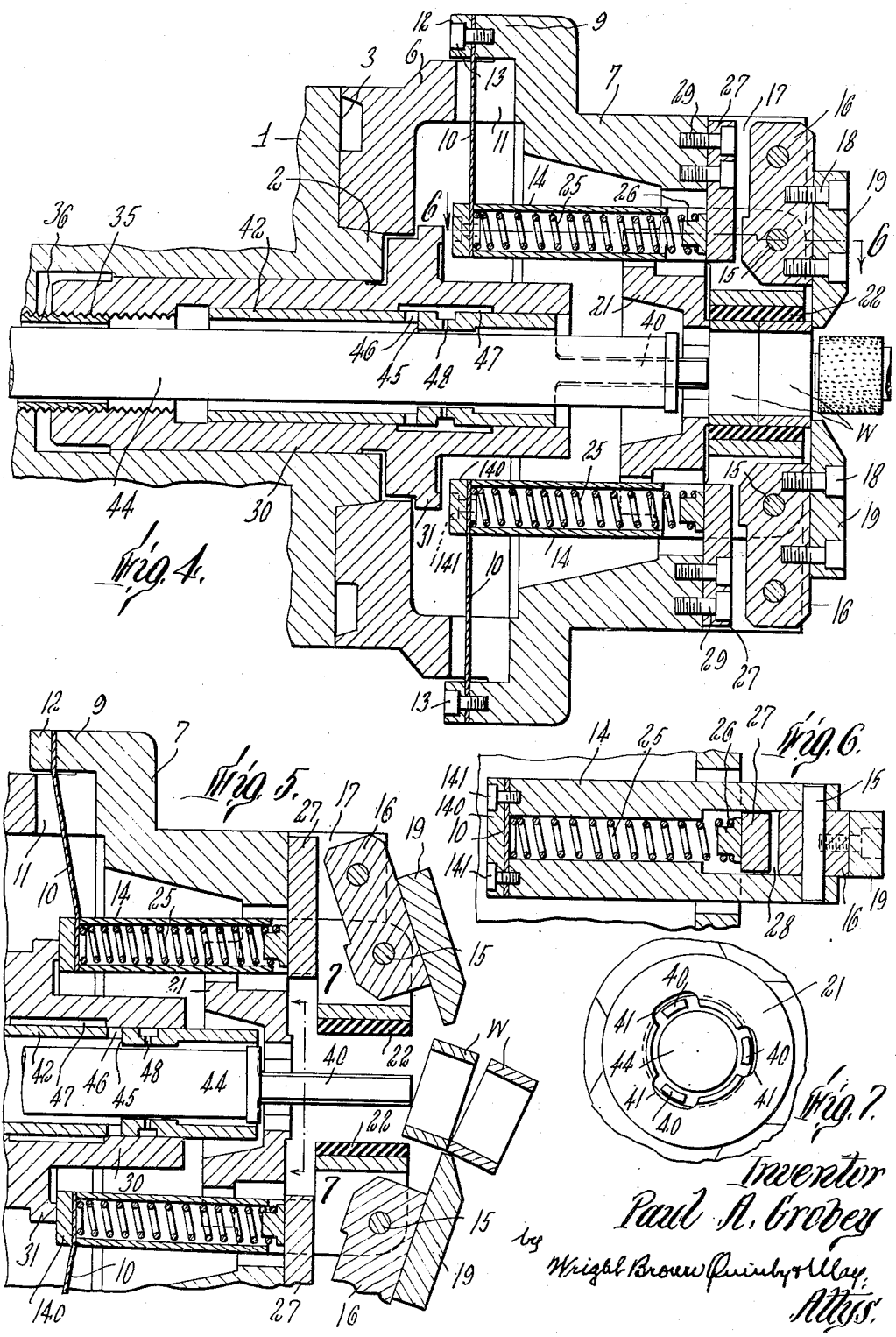

2,691,531

UNITED STATES PATENT OFFICE 2,691,531

MULTIPLE WORKPIECE CHUCK

Paul A. Grobey, Springfield, Vt., assignor to Bryant Chucking Grinder Company, Springfield, Vt., a corporation of Vermont Application May 20, 1952, Serial No. 288,777

13 Claims. (Cl. 279—35)

This invention relates to chucks and has for an object to hold a plurality of work pieces simultaneously, centering them from their outside surfaces, and clamping them together endwise. For this purpose the work pieces are held by pivoted end clamping jaws against a backing member and are centered by members carried by the jaw operating means.

For a complete understanding of this invention, reference may be had to the accompanying drawings in which Figure 1 is an outer end face view of a chuck embodying the invention.

Figures 2 and 4 are detail sectional views on lines 2—2 and 4—4, respectively, of Figure 1.

Figure 3 is a detail sectional view to a smaller scale than Figure 2 and showing the rear portion of the work spindle.

Figure 5 is similar to a portion of Figure 4, but showing the chuck jaws open and work pieces being ejected.

Figure 6 is a detail sectional view on line 6—6 of Figure 4.

Figure 7 is a detail sectional view on line 7—7 of Figure 5.

Referring first to Figures 2, 4, and 5, at 1 is shown the forward end of a rotary spindle provided with means such as a standard spindle nose for attachment of a chuck thereto. As shown, for example, this standard spindle nose includes an annular forwardly projecting portion 2 having a tapered outer wall and having a flat end face 3 to which the chuck may be secured by suitable screws 4 (see Figures 1 and 2).

The body member is formed of two parts, a rear part 6 which is directly secured to the spindle nose as by the screws 4, and a forward annular part 7 securable to the part 6 as by screws 8 (Figure 2). By...

may be attached thereto as shown in Figure 2 as by the screws 20.

The outer ends of the elements 14 are turned inwardly toward the axis of the body and these inturned ends may be faced with a yieldable cushioning material such as rubber as at 22. The inner faces of these members 22 are carefully ground to render them coaxial with reference to the body and the spindle, and when the jaws 16 are in the substantially radial position shown in Figure 4, the inner faces of these members 22 close against the outer peripheral faces of the work pieces W and hold them in alinement with each other and with their outer faces concentric, leaving their inner faces free for a machining operation in coaxial relation to the outer faces which are gripped by the elements 22. Since these elements 14 are pivoted to the jaws 16, it will be evident that as the jaws 16 are swung forwardly to release their backward pressure on the work pieces, the elements 22 are given a radial outward component of motion which releases them from pressure against the outer faces of the work pieces. Thus both the elements 14 and the jaws 16 are moved either to clamp or release the work pieces simultaneously with each other. The clamping jaws and the elements 14 are normally pressed toward clamping position as by coil springs 25, each housed within one of the elements 14 and reacting at their rear ends against the forward faces of the leaf springs 10 and at their forward faces against abutments 26, each carried by a plate 27 seated in a slot 17 at its outer end and at its inner end riding within slot 28 in the corresponding elements 14 and secured to the forward face of the body member 7 as by screws 29 as shown in Figure 4. Thus the springs 25 tend to hold the clamping jaws and Oct. 12, 1954 DE ELDON E. HAYNER 2,691,532
STOP DEVICE FOR ROLLER SKATES
Filed March 20, 1953
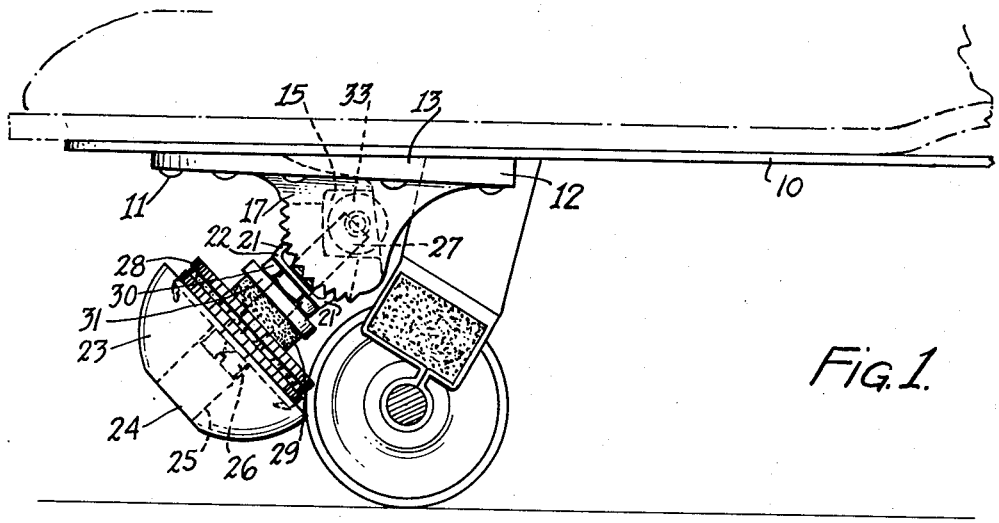
Fig. 1.
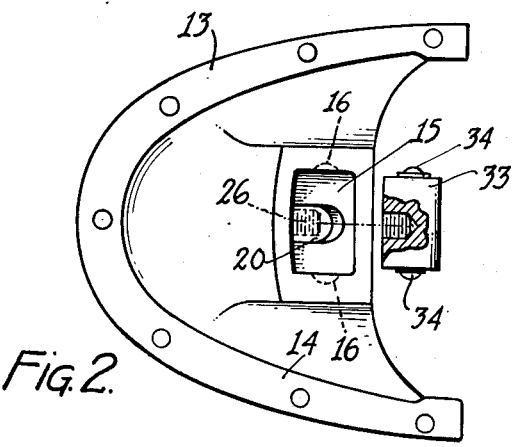
Fig. 2.
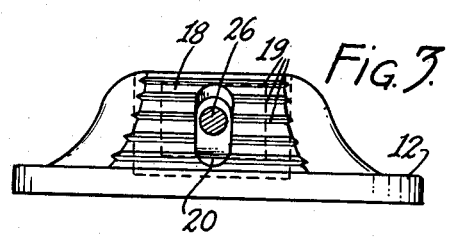
Fig. 3.
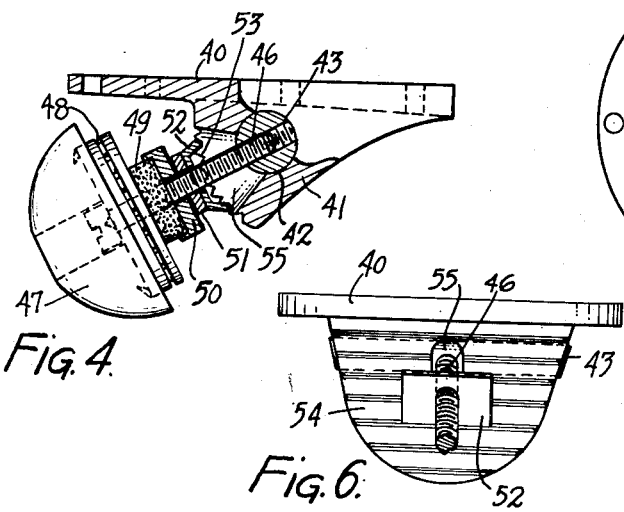
Fig. 4.
Fig. 6.
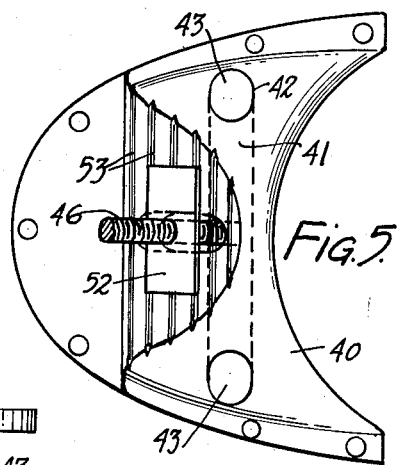
Fig. 5.
INVENTOR.
DE ELDON E. HAYNER
BY